No. 12,512. REISSUED JULY 24, 1906.

C. G. PERRIN.

STEM WINDING AND SETTING MECHANISM FOR WATCHES.

APPLICATION FILED DEC. 4, 1905.

Attest:
C. S. Middleton
Edward N. Sartor

Inventor:
Charles Glauser Perrin.
by Richards & Co
Attys.

THE NORRIS PETERS CO., WASHINGTON, D. C.

UNITED STATES PATENT OFFICE.

CHARLES GLAUSER PERRIN, OF LE LOCLE, SWITZERLAND.

STEM WINDING AND SETTING MECHANISM FOR WATCHES.

No. 12,512. Specification of Reissued Letters Patent. Reissued July 24, 1906.

Original No. 798,364, dated August 29, 1905. Application for reissue filed December 4, 1905. Serial No. 290,326.

*To all whom it may concern:*

Be it known that I, CHARLES GLAUSER PERRIN, a citizen of Switzerland, residing at Le Locle, canton of Neuchâtel, Switzerland, have invented certain new and useful Improvements in Winding and Setting Mechanism for Watches, of which the following is a specification.

The object of my invention is to provide such a construction of parts as will permit the crown-stem to be inserted or removed without requiring any detachment of connected parts within the casing. This permits of the insertion or removal of the crown-stem at will by simply loosening its external connection and requires no adjustment of the internal parts, so that in case of need a new crown-stem could be inserted without requiring access to the interior mechanism of the case.

Figure 1:
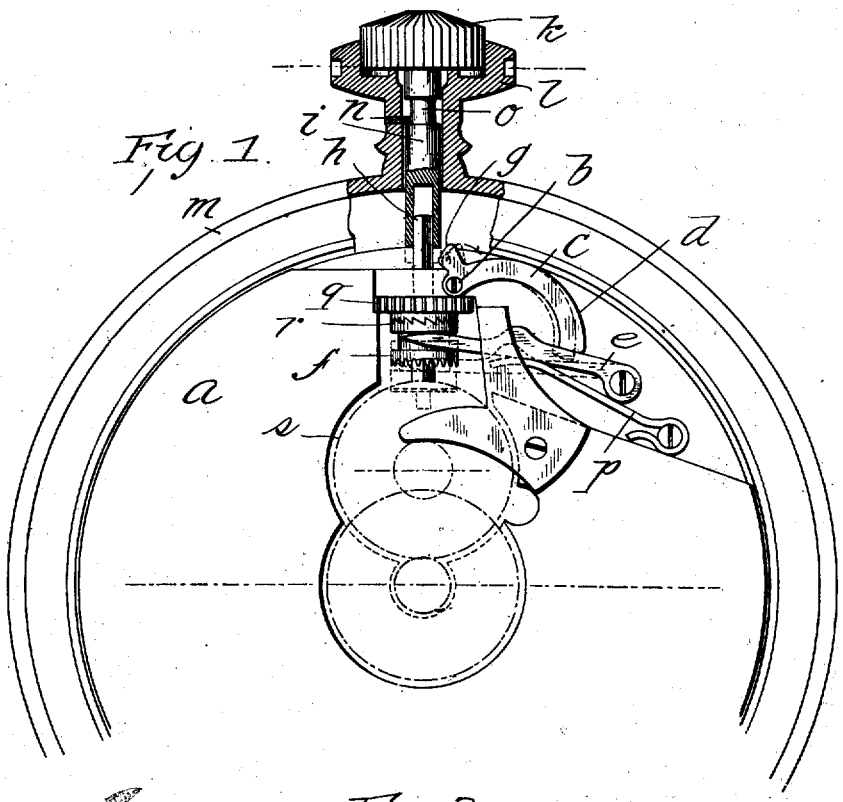
Figure 2:
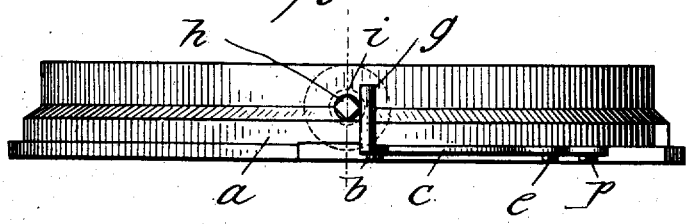

In the accompanying drawings, Figure 1 is a view in partial elevation and section of one form of the present invention; Fig. 2, a plan of the winding-stem, the rim of the case, with its pendant and crown-stem, being removed; and Fig. 3, a partial elevation of a slightly-modified form of the invention.

On the main plate *a* a lever *c* is pivoted at *b*. The lower end *d* of this lever acts on the pivoted lever *e*, which actuates the sliding pinion *f*, while the upper end is formed as a nose *g*, placed near the end of the winding-stem *h* nearly perpendicularly to the stem and passing over the outer circumference of the plate *a*.

The crown-stem *i*, which is firmly connected with the winding-knob *k*, is adjusted loosely in the pendant *l*, which is soldered to the rim of the case. The longitudinal play of the stem is simply limited by a small screw *n*, fixed to the pendant *l* and projecting into a groove *o* in the crown-stem *i*. The end of crown-stem *i* normally rests just above the nose *g* of the lever *c*, the nose *g* forming an inclined plane.

A spring *p*, acting beneath the pivoted lever *e*, has a tendency to keep the sliding pinion *f* in permanent contact with the winding-pinion *q* by means of the teeth *r* on the respective pinions. The action of the spring *p* extends to the lever *c*, the end *d* of which has a constant tendency to ascend under the action of the pivoted lever *e*, the effect of which is to cause the nose *g* of the lever *c* to rest in close proximity to the winding-stem *h*, as shown in fully-drawn lines in the drawings. In this position if the winding-knob *k* be turned the mainspring is wound through the medium of the winding-pinion *q*.

If the winding-knob *k* be pressed inward, the lower end of the stem *i* acts on the nose *g* of the lever *c*, the end of which is lowered, and presses down the pivoted lever *e*, thus lowering the sliding pinion *f*, which engages with the motion work-wheel *s*, the parts thus being in the position for setting the watch, as shown by dotted lines in Fig. 1. This position is assured by the fact that the crown-stem *i* is clamped between the winding-stem *h* and the lower part of the nose *g*. If the winding-knob be released, the different parts of the mechanism resume their first position—that for the winding under the action of the spring *p*.

Figure 3:
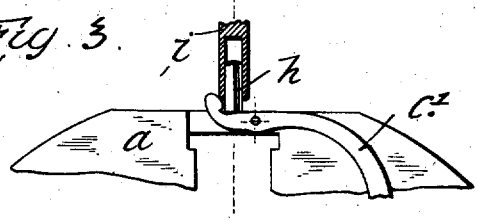

The movement of the sliding pinion can be reversed in relation to that of the crown-stem—that is to say, that if the winding-knob be pushed in the sliding pinion may be put in contact with the winding-pinion and if it be forced out the sliding pinion engages with the motion-wheelwork. For this purpose it is only necessary to arrange the lever actuated by the crown-stem so that the nose of the lever is on the side opposite to that in Figs. 1 and 2, as shown in Fig. 3 of the drawings. The lever may, moreover, be arranged on either side of the winding-stem, provided that the nose of the lever be placed very near the stem and that it can be operated by the end of the crown-stem.

Winding and setting mechanism of this kind is extremely simple, sure in action, and very easily regulated. It entirely dispenses with the spring device contained in the pendant in what is termed "negative-winding" mechanism—a device which is expensive and troublesome to regulate.

The nose-lever *c*, operated by the end of the crown-stem, can effect the winding and setting through the medium of other parts than the pivoted lever *e* and the sliding pinion described above and illustrated as an example of the invention, and the form and dimensions of the said nose-lever and of the crown-stem may vary. The nose-lever may be pivoted on any fixed part of the movement near the winding-pinion—as, for example, the slate, the bridge, potance, block, or the like.

What I claim is—

1. In a winding and setting mechanism for watches, a winding-pinion, a motion work-wheel, a sliding clutch-pinion between, a lever pivoted on a fixed part of the movement near the winding-pinion adapted to actuate the sliding pinion, said lever having an inclined end or portion and a crown-stem adapted to move the lever, the end of said stem bearing against the said inclined end of the lever but having no positive connection therewith whereby the stem may be removed from contact with the lever or replaced to be in contact therewith without disconnection of any parts within the casing and when moved to operate said lever the said inclined end will ride up onto and rest against the side of the stem, substantially as described.

2. In a winding and setting mechanism for watches, a winding-pinion, a motion work-wheel, a sliding clutch-pinion, a crown-stem having a limited movement, and an actuating-lever for the sliding pinion, the end of said lever having an inclined face in the path of the movement of the end crown-stem and adapted to ride up over said end onto the side of the stem, substantially as described.

3. In combination in winding and setting mechanism for watches, a winding-stem *h*, a sliding pinion thereon, a winding-pinion *q* loosely mounted on the stem *h*, a motion work-wheel *s*, a lever *e* for shifting the sliding pinion into engagement with either the winding-wheel or said wheel, *s*, a spring for normally keeping the sliding pinion in engagement with the winding-pinion *q*, a two-arm lever *e* having one end engaging with the lever *e* and its other arm having a nose *g* thereon, said nose lying in close proximity to the upper end of the stem *h* and a sliding crown-stem having its lower end engaging with the stem *h* and being adapted to be pinched between the said stem and the nose *g*, when pushed downward so as to depress the other arm of the lever *e* to throw the pinion into engagement with the wheel *s*.

CHARLES GLAUSER PERRIN.

Witnesses:
F. L. MIDDLETON,
WALTER DONALDSON.